United States Patent
Marjou et al.

(10) Patent No.: US 10,476,812 B2
(45) Date of Patent: Nov. 12, 2019

(54) NOTIFICATION OF BANDWIDTH CONSUMPTION INFORMATION TO A SERVICE PROVIDER IN A TELECOMMUNICATIONS NETWORK

(71) Applicant: ORANGE, Paris (FR)

(72) Inventors: Xavier Marjou, Lannion (FR); Gael Fromentoux, Pleumeur Bodou (FR); Antonin Marechal, Lannion (FR)

(73) Assignee: ORANGE, Paris (FR)

( * ) Notice: Subject to any disclaimer, the term of this patent is extended or adjusted under 35 U.S.C. 154(b) by 22 days.

(21) Appl. No.: 15/118,535

(22) PCT Filed: Feb. 9, 2015

(86) PCT No.: PCT/FR2015/050305
§ 371 (c)(1),
(2) Date: Aug. 12, 2016

(87) PCT Pub. No.: WO2015/121573
PCT Pub. Date: Aug. 20, 2015

(65) Prior Publication Data
US 2017/0063716 A1 Mar. 2, 2017

(30) Foreign Application Priority Data
Feb. 14, 2014 (FR) ...................... 14 51160

(51) Int. Cl.
*H04L 12/801* (2013.01)
*H04L 12/927* (2013.01)
(Continued)

(52) U.S. Cl.
CPC .......... *H04L 47/801* (2013.01); *H04L 43/062* (2013.01); *H04L 43/0876* (2013.01);
(Continued)

(58) Field of Classification Search
None
See application file for complete search history.

(56) References Cited

U.S. PATENT DOCUMENTS

| 6,594,486 B1 * | 7/2003 | Rasanen | H04W 36/14 370/467 |
| 8,725,885 B1 * | 5/2014 | Ryner | G06F 21/45 709/228 |

(Continued)

FOREIGN PATENT DOCUMENTS

WO WO-03036873 A1 * 5/2003 ............. H04L 41/12

OTHER PUBLICATIONS

Brunetti et al., "Open Network Quality of Service and Bandwidth Control: Use Cases, Technical Architecture, and Business Models," Bell Labs Technical Journal, Wiley, CA, US, vol. 16(2), Sep. 1, 2011, pp. 133-152.

(Continued)

*Primary Examiner* — Ayanah S George
(74) *Attorney, Agent, or Firm* — Drinker Biddle & Reath LLP (57) ABSTRACT

A method for notifying a service provider, performed in a telecommunications network, said method comprising the following steps of: selecting a stream of data transported in the telecommunications network for at least one user terminal of the service provider; comparing a bandwidth value consumed by the selected data stream with a bandwidth threshold; sending a notification to the service provider, said notification comprising at least one identifier of the selected data stream and an indication of the result of the comparison.

11 Claims, 2 Drawing Sheets

(51) Int. Cl.
*H04L 12/26* (2006.01)
*H04L 29/06* (2006.01)
*H04L 12/851* (2013.01)

(52) U.S. Cl.
CPC ............ *H04L 43/16* (2013.01); *H04L 65/608* (2013.01); *H04L 65/80* (2013.01); *H04L 47/2441* (2013.01)

(56) References Cited

U.S. PATENT DOCUMENTS

| | | | |
|---|---|---|---|
| 2009/0022064 A1* | 1/2009 | Oron | H04L 41/0896 370/253 |
| 2009/0213860 A1* | 8/2009 | Liu | H04L 12/2859 370/395.53 |
| 2010/0284300 A1 | 11/2010 | Deshpande et al. | |
| 2012/0054772 A1* | 3/2012 | Raveendran | H04N 21/4348 718/105 |
| 2014/0115479 A1* | 4/2014 | Wang | H04L 67/322 715/727 |
| 2015/0002619 A1* | 1/2015 | Johnston | H04N 7/147 348/14.12 |

OTHER PUBLICATIONS

Chuah et al., "DCAP: Detecting Misbehaving Flows via Collaborative Aggregate Policing," Computer communications Review, ACM, New York, NY, US, vol. 33(5), Oct. 1, 2003, pp. 5-18.

* cited by examiner

NOTIFICATION OF BANDWIDTH CONSUMPTION INFORMATION TO A SERVICE PROVIDER IN A TELECOMMUNICATIONS NETWORK

CROSS-REFERENCE TO RELATED APPLICATIONS

This application is the U.S. national phase of the International Patent Application No. PCT/FR2015/050305 filed Feb. 9, 2015, which claims the benefit of French Application No. 14 51160 filed Feb. 14, 2014, the entire content of which is incorporated herein by reference.

BACKGROUND

The present invention relates to the processing of data in a telecommunications network.

It relates more particularly to the sending of notifications from a network operator to service providers hosting and managing services in the network, particularly notifications concerning the consumption of resources (bandwidth) by users of such service providers.

"Service Provider" is understood to mean any entity able to provide any kind of service involving data streams exchanged on the telecommunications network. The data stream may be transported over the network between a user terminal and a dedicated server of the service provider, or may be transported between two user terminals, for example when the data streams are WebRTC ("Web Real Time Communication"). In the latter case, the service provider allows the two users to establish a connection and then exchange WebRTC data streams directly. Although the invention is described specifically in connection with WebRTC streams, it applies to any type of data stream.

The WebRTC protocol is a protocol for establishing direct peer-to-peer (P2P) communications between Internet browsers installed on two user terminals. For example, it allows P2P videoconferencing and media exchange, P2P file sharing, or VoIP ("Voice over Internet Protocol").

The WebRTC protocol offers three programming interfaces (APIs):
- the MediaStream (MS) API for accessing a user's data streams (video via a webcam, audio via the microphone, etc.);
- the PeerConnection (PC) API for establishing P2P communication between two users' browsers and for exchanging conversational data streams (audio and video that can be transported with the SRTP/UDP protocol suite);
- the DataChannel (DC) API for exchanging raw data streams (text or binary data that can be transported with the SCTP/DTLS/UDP protocol suite).

The use of WebRTC PC and DC APIs generates P2P data streams that typically use the UDP ("User Datagram Protocol") transport protocol, but sometimes the TCP ("Transmission Control Protocol") transport protocol. "Data stream" is understood to mean a set of data packets transmitted unidirectionally between two entities (two P2P user terminals or between a user terminal and a server). A data stream is characterized by a source IP address (the sender of the stream), a source port number, a destination IP address (the recipient), a destination port number, and a transport protocol.

A service provider often uses the maximum possible bandwidth without taking into account the bandwidth requirements of other service providers on the network.

In the WebRTC context for example, the browser of a user terminal does not take into account the bitrate used; although it may provide statistical information (bits sent, bits received, timestamp data) that enable measuring the bitrate used by a WebRTC API, this does not allow controlling the bitrate.

Some WebRTC software implementations offer congestion prevention mechanisms defined by the RMCAT ("RTP Media Congestion Avoidance Techniques") working group for the SRTP ("Secure Real-time Transport Protocol") protocol for the PC API, and mechanisms inherent to the SCTP ("Stream Control Transmission Protocol") protocol for the DC API.

However, these mechanisms are intra-stream mechanisms, as they only prevent the data stream from causing local congestion on the telecommunications network. These software implementations do not provide for cross-stream mechanisms.

However, some data streams can consume many more bits per second than other data streams, transported by the TCP protocol for example, which impacts the available bandwidth for TCP data streams such as Youtube™ or Facebook™ data streams. In particular, a WebRTC data stream may consume so many resources that it can impact other WebRTC data streams.

Thus a situation of congestion or pre-congestion may occur in the telecommunications network, and a data stream can monopolize a significant portion of the available bandwidth without the service provider in charge of the data stream being aware of the congestion situation. The service provider thus cannot implement an appropriate policy for adjusting the bandwidth allocation for some of its users, and the congestion situation is not resolved.

The work of the IETF ("Internet Engineering Task Force") on CONEX ("CONgestion EXposure") provides a technical solution where network equipment can indicate to the service provider, and to other network elements along the path of the data stream, the state of congestion in the network. For this purpose, a congestion flag is set at the IP layer. The flag is detectable by any entity through which the data stream travels.

The CONEX solution therefore makes the congestion information public, which is undesirable for confidentiality reasons for some service providers. In addition, it is only compatible with the TCP transport protocol and does not handle data streams transported by UDP. Use of the UDP transport protocol is increasing because of its speed, however. The control of congestion by existing solutions is therefore not possible for controlling data streams transported by UDP.

In general, there is a need to control the bandwidth consumed by data streams transported by a certain protocol, while maintaining a high level of confidentiality for the service providers in charge of the data streams.

SUMMARY

The present invention improves the situation.

For this purpose, it proposes a method for notifying a service provider, implemented in a telecommunications network, the method comprising the steps of:
- selecting a data stream transported in the telecommunications network for at least one user terminal of the service provider;
- comparing a value of the bandwidth consumed by the selected data stream, to a bandwidth threshold;

sending a notification to the service provider, the notification comprising at least one identifier of the selected stream and an indication of a result of the comparison.

The invention thus directly gives the service provider an indication of the bandwidth consumed by the data streams it manages. The indication may indicate that the data stream is receiving a fair share or on the contrary that it is receiving an unfair share.

The service provider is thus the only one to have access to the information contained in the notification, unlike the CONEX solution where a flag is inserted in an IP layer visible to all network elements along the path of the data stream. The notification potentially also includes more information than a simple flag added to the stream.

As described above, a data stream may be identified by a set of information identifying the address of the data stream source, the destination address, and the protocol transporting the data stream. The data stream may, however, be identified by additional information, detailed below.

The invention provides for sending a notification to the service provider hosting and managing the data stream. No restrictions are placed on the nature of the service or the protocols used to transport the data stream. It may, for example, be a data stream between a user and a server of the service provider, or between two users in P2P. In addition, no restrictions are placed on the manner in which the service provider is identified.

The bandwidth threshold may be fixed or dynamic, and may for example be dependent on an average bandwidth consumed per user in the telecommunications network.

No restrictions are placed on the means of user access to the telecommunications network. For example, the use of any terminal such as a laptop or desktop computer, smartphone, touchpad, or PDA may be considered. Access may be through a fixed or mobile access point.

No restrictions are placed on the use made by the service provider of the indication of the comparison result. The service provider may, for example, collect multiple indications from several different network operators in order to compare them, or may use the indication to restrict the resources allocated to specific users.

According to one embodiment, the data stream may be selected upon detection of a protocol used to transport the data stream. Such an embodiment allows focusing the notification on certain types of service, such as those which are very resource intensive and more likely to congest the telecommunications network.

In one particular embodiment, the protocol may be the WebRTC protocol and the data stream may be transported between at least two user terminals. WebRTC data streams, which are particularly demanding in resources, can thus receive special attention in order to detect potentially unfair streams.

According to one embodiment, the method comprises the prior detection of at least one negotiation message for setting up the data stream, the data stream selection being based on the negotiation message.

"Negotiation message" is understood to mean a message preceding a data stream exchange, which allows defining a protocol used for the data stream or provides a security policy to be applied for example (exchange of encryption keys for example).

The negotiation message may be, for example, a "handshake" message defined by the DTLS or TLS protocol. Such a message, which enables setting up security for data streams, has the advantage of traveling unencrypted over the network and is therefore accessible to any network entity that can intercept it in the telecommunications network.

Additionally or alternatively, the WebRTC protocol may be detected for the data stream transport upon detection of at least one STUN frame exchanged between the two user terminals prior to detection of the negotiation message according to the TLS or DTLS protocol.

The WebRTC protocol specifies an exchange of STUN frames prior to sending a TLS/DTLS negotiation message. A STUN frame allows users to exchange addresses (IP address/port number) where they wish to receive the WebRTC data stream. Detection of a STUN frame exchange between two users, followed by a DTLS or TLS negotiation message exchange between these users allows providing, in a transparent and non-intrusive manner, the next WebRTC data stream exchange to be selected between the two users.

Alternatively, the negotiation message may comprise a first attribute, and the data stream selection is then based on this first attribute.

"First attribute" is understood to mean any information included in the negotiation message. This first attribute may be inserted, for example, in a header of the DTLS/TLS negotiation message. Alternatively, the first attribute may be inserted in a DTLS/TLS certificate for example. The latter implementation facilitates implementation of the system because the certificate is managed by the service provider.

The first attribute may identify a protocol used to transport the data stream. In this case, selection of the data stream is based on the stream so identified. Such a selection method has the advantage of being simplified compared to the successive detection of STUN frames and of a DTLS/TLS message.

Additionally or alternatively, the negotiation message comprises a second attribute identifying the service provider and making it possible to contact one or more network devices of the service provider, the notification message being sent to the service provider or to the device identified by this second attribute.

This guarantees a certain anonymity of the service provider; the service provider having previously contacted the network operator to obtain this identifier, a lookup table then allows mapping this identifier to the device or devices to be contacted to give them the notification.

Additionally or alternatively, the second attribute contains an indicator of the protocol used to transport the data stream and a notification server address. This embodiment provides a simple manner of notifying the service provider to be notified. In addition, it avoids the need for prior declaration by the service provider to the network operator; the service provider does not even need to know the network operator with this embodiment.

According to one embodiment of the invention, the method may comprise a step of storing a database associating service providers with respective network identifiers of users; the user of the service provider can then be identified in the network by a given network identifier and the notification can be sent to the service provider associated with it in the database, at the given network identifier.

Thus, in the case where the negotiation message does not include said second attribute, a network operator can still identify a service provider to be notified, by means of a prior step of declaring users of the service provider. Observation of the source and destination network identifiers is transparent and non-intrusive.

For example, a user's network identifier may comprise an IP address/port number data pair.

According to one embodiment, the identifier of the selected stream, sent in the notification, comprises at least one of the following:

an identifier of the network operator;
    at least one identifier of the user;
    a timestamp indicating the moment when the consumed bandwidth was compared to the bandwidth threshold.

This information allows the service provider to identify the data stream accurately, for the purpose of possibly restricting the bandwidth allocated to it if the data stream is considered to be receiving an unfair share.

In addition, the notification may further comprise a recommendation for adjusting the bandwidth allocated to the stream by the service provider, when the bandwidth value exceeds the first threshold.

In this case, the notification server advantageously indicates to the service provider the restriction to be applied to the selected data stream.

A second aspect of the invention relates to a system for notifying a service provider, the system comprising:

a sensor configured to select a data stream transported in a telecommunications network, for at least one user terminal of the service provider;
    comparison means for comparing a value of the bandwidth consumed by the selected stream to a bandwidth threshold;
    a notification server configured to send a notification to the service provider, the notification comprising at least one identifier of the selected stream and an indication of a result of the comparison.

A third aspect of the invention relates to a computer program product comprising instructions for implementing the method according to the first aspect of the invention when the program is executed by a processor.

BRIEF DESCRIPTION OF THE DRAWINGS

Other features and advantages of the invention will become apparent upon examining the following detailed description and the appended drawings in which.

DETAILED DESCRIPTION

Figure 1:
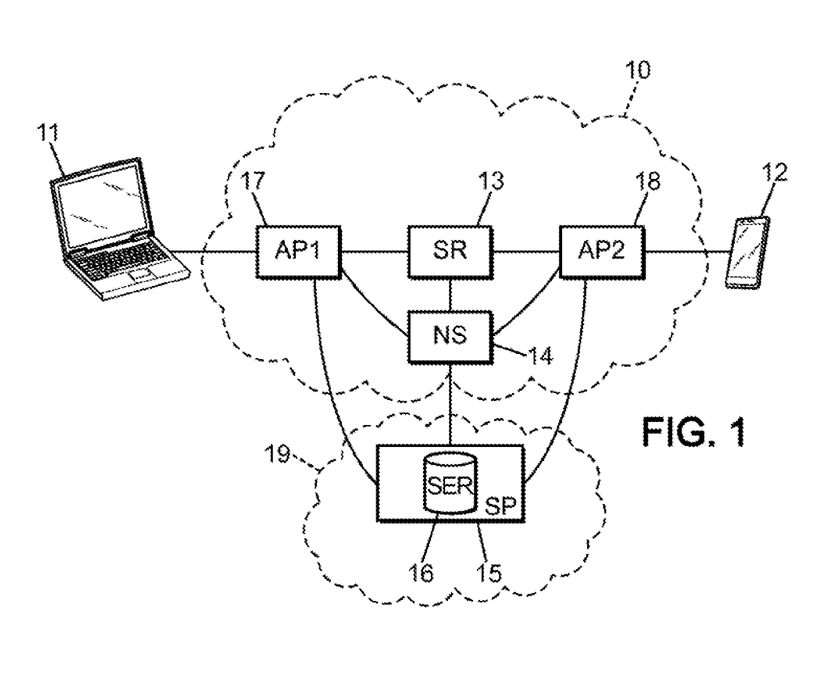
FIG. 1 illustrates a system for notifying a service provider, according to an embodiment of the invention.

FIG. 1 illustrates a system for notifying a service provider 15, according to an embodiment of the invention.

A telecommunications network 10 is accessible to a first user terminal 11 via a first access point 17, and to a second user terminal 12 via a second access point 18. The telecommunications network 10 may be the telecommunications network of a single telecommunications operator, typically connected to the Internet, or may consist of several networks belonging to different telecommunications operators, the access points 17 and 18 then possibly each belonging to different networks.

For example, the first user terminal 11 may be a laptop or desktop computer and the first access point 17 may be a wired access point or a Wi-Fi hotspot. The second user terminal 12 may be a mobile telecommunications terminal such as a smartphone or touchpad for example, which can access a wireless telecommunications network such as 3G or 4G for example. In this case, the second access point 18 may be a NodeB/eNodeB type of access point.

The first user terminal can access a service provider 15 via the first access point 17. In the example shown, the service provider 15 is providing OTT ("Over The Top") service and allows, for example, data stream exchanges between the first user terminal 11 and the second user terminal 12, using the WebRTC protocol.

The system further comprises at least one sensor 13 located between the first access point 17 and the second access point 18. In an embodiment with two sensors, a first sensor may be located on the network access associated with the first access point 17 and a second sensor may be located on the network access associated with the second access point 18, which allows configuring a different detection threshold (in terms of bandwidth) for each access point.

The sensor(s) 13 is connected to a notification server 14 of the operator of the telecommunications network 10. The notification server 14 is capable of communicating with a notification reception server 16 of the service provider 15, typically located in a service provider network 19 that is separate from and independent of the telecommunications network 10.

Referring to FIG. 1, the invention is represented in the context of an OTT type of service provider 15 for establishing P2P data exchange services directly between two users.

However, the invention also applies to services involving only data exchanges between a service provider server and a user. In this case, the data streams can be exchanged between the first user terminal 11 and the service provider 15, and the sensor 13 can then be located between the first access point 17 and the service provider 15.

Figure 2:
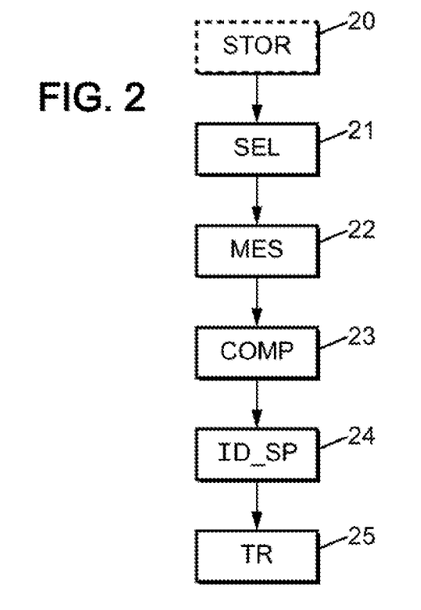
FIG. 2 is a diagram illustrating the steps of a notification method according to an embodiment of the invention.

FIG. 2 shows a diagram illustrating the steps of a notification method according to an embodiment of the invention.

The method comprises a step 21 of selecting a data stream transported in the telecommunications network 10 to at least one user terminal 11 of the service provider 15. Such a selection may be based on the protocol used to transport the data stream.

In addition, the selection of a data stream may comprise the detection of a negotiation message for setting up the data stream, and the selection of the data stream is made on the basis of this negotiation message. For this purpose, the negotiation message may include a first attribute, and the data stream selection is then made based on the first attribute detected in the negotiation message. The first attribute may identify the protocol used to transport the data stream, in order to select the data stream based on the transport protocol used by this stream.

The negotiation message may further comprise a second attribute identifying the service provider 15. This second attribute is described below.

In the example of FIG. 1, the data stream is a data stream using the WebRTC protocol, between the first user terminal 11 and the second user terminal 12. Step 21 may thus be implemented by the sensor 13 when it detects that the data stream between the first user terminal 11 and the second user terminal 12 is a WebRTC data stream.

As indicated above, the detection of a WebRTC stream may be based on prior detection of a negotiation message which usually precedes this type of stream. Preferably, the negotiation message is a handshake message as defined by the TLS ("Transport Layer Security") or DTLS (for "Datagram Transport Layer Security") application encryption protocol. TLS is typically used with the TCP transport protocol, while DTLS is used with the UDP transport protocol. The following discussion concerns the use of the DTLS protocol in combination with the UDP protocol, for illustrative purposes. The WebRTC transport protocol is preferably used with the DTLS application encryption protocol, with the PC API using the SRTP protocol on DTLS while the DC API uses the SCTP protocol on DTLS.

The handshake message is exchanged between the first user terminal 11 and the second user terminal 12 prior to the exchange of data in the WebRTC stream. The sensor 13 can therefore detect the DTLS negotiation message that sets up DTLS security for the exchanges.

In the invention, several embodiments are provided for the detection of a WebRTC data stream.

According to a first embodiment, the DTLS negotiation message comprises a first attribute identifying the WebRTC protocol as the protocol used to transport the data stream, the detection of this first attribute enabling selection of the data stream after the negotiation message. The negotiation message may also include a second attribute identifying the service provider 15, and other additional attributes.

The DTLS negotiation message may, for example, include the following attributes:
application_protocol=sctp-webrtc-datachannel: said first attribute, which identifies the protocol or service used to transport the data stream which will be encrypted by DTLS. In this case, it is the DC API of WebRTC;
service_provider=notification.dailymotion.com: second attribute identifying the service provider 15. In particular, the second attribute identifies the notification reception server 16 of the service provider 15. The second attribute may, for example, be a URI ("Uniform Resource Identifier"). The URI may include an address of the notification reception server 16 of the service provider 15, or a generic identifier of the service provider 15;
version_application_protocol-00: attribute announcing the version of the protocol or service used to transport the data stream;
user_identifier=161c50b2: attribute identifying the user of the first user terminal 11 or second user terminal 12, or of both terminals, at the service provider 15.

The above four attributes (or any obtained combination based on the above four attributes) can be grouped in an extension that can be included in "ClientHello" and "ServerHello" types of messages. This extension may be inserted into a header of the DTLS negotiation message. Alternatively, it may be inserted into a DTLS certificate of the DTLS negotiation message.

Choosing to use a DTLS (or TLS) negotiation message for the insertion of the aforementioned extension is motivated by the following reasons:
the DTLS protocol has the advantage of being an unencrypted protocol. The content of the DTLS message is therefore accessible to the sensor 13;
the data at the application level are often encrypted, and therefore cannot be used for insertion of the extension (which would be undetectable by the sensor 13);
at the transport layer, the TCP and UDP protocols do not allow transporting information concerning the application or the service, such as the second attribute of the extension identifying the service provider 15;
the lower layers, such as the IP layer, have no header available for such an extension.

In this step 21, the sensor 13 may also store the network identifier of at least one user involved in the selected data stream. A user's network identifier may, for example, be an IP address/port number data pair for the user terminal 11 or 12. Alternatively, the user's network identifier may only be an IP address of the user terminal 11 or 12.

In a second embodiment which enables selecting a data stream even when the DTLS negotiation message does not include the aforementioned extension, this selection is made on the basis of a specific concatenation of signaling messages characterizing the stream in question.

Thus, before any exchange of WebRTC data, it may be required that two users exchange the IP addresses/port numbers where the WebRTC data stream will be received. To this end, the ICE ("Interactive Connectivity Establishment") protocol indicates to the user terminals 11 and 12 to send at least one STUN frame in order to exchange their IP addresses/port numbers.

Such an exchange of addresses occurs before the exchange of DTLS negotiation messages. In other words, after sending a first STUN frame from the first terminal 11 to the second terminal 12 and sending a second STUN frame from the second terminal 12 to the first terminal 11, the user terminals 11 and 12 exchange DTLS negotiation messages as described above, in order to encrypt the WebRTC data stream. An exchange of at least one STUN frame followed by an exchange of a DTLS negotiation message between the same user terminals thus allows identifying a WebRTC data stream, because the WebRTC protocol is currently the only one to use such exchanges in a combined manner.

Thus, upon detection of a STUN frame exchange followed by detection of a DTLS negotiation message exchange between user terminals 11 and 12, the sensor 13 stores the IP addresses/port numbers of the user terminals 11 and 12 in order to select the WebRTC data stream to be exchanged following these exchanges.

After step 21 of selecting a data stream, the sensor 13 signals to the notification server 14 that a data stream has been selected, and sends it the IP addresses/port numbers of the user terminals 11 and 12 involved in the stream. In the case where the sensor 13 further detects the second attribute identifying the service provider, said second attribute is also transmitted to the notification server 14. In addition, the attribute "user identifier" may also be sent to the notification server 14.

The method comprises a step 22 of measuring the bandwidth consumed by the data stream. Such a step may, for example, be implemented by at least one of the access points 17, 18, and the bandwidth measurements are sent to the notification server 14 with the data identifying the data stream (source and destination IP addresses, source and destination port numbers, transport protocol). The notification server 14 can thus catalog the bandwidth measurements for multiple data streams.

When the notification server 14 receives a bandwidth measurement for a data stream that was selected in step 21, it carries out a step 23 of comparing the bandwidth value for the data stream (for example the total bandwidth) to a bandwidth threshold. If the bandwidth value is less than the bandwidth threshold, the data stream is considered to be receiving its fair share. If not, it is considered to be unfair. To collect these measurements, the notification server 14 may include a "Big Data Analytics" tool for archiving and identifying the data streams with bandwidth values characteristic of fair and unfair streams, for example according to the type of access (fixed 17 or mobile 18 IP access point) and its use by other data streams.

The measurements made by the access points 17, 18, or alternatively by the sensor 13, may be sent from the sensor 13 to the notification server 14 at regular time intervals for example.

Alternatively, comparison step 23 may be implemented directly by the access point measuring the bandwidth consumed, and only the result of the comparison is sent to the notification server 14 with the data identifying the data stream. In this case, the results of a comparison performed by the access point 17 or 18 may be sent from the sensor 13 to the notification server at regular intervals, or alternatively when the result of the comparison changes (when the consumed bandwidth value reaches the bandwidth threshold for example).

The bandwidth threshold may be preset to a fixed value or may be the average value of the bandwidth consumed per user in the telecommunications network. No restrictions are placed on determining the bandwidth threshold, which may be fixed or dynamic.

Upon obtaining the result of the comparison of the consumed bandwidth value for the selected data stream with the bandwidth threshold, the invention directly notifies the service provider that hosts and manages the service between the users, indicating the result of this comparison.

To this end, the notification server 14 identifies, in step 24, the service provider to be notified. Such identification depends on the information acquired by the sensor 13 during the data stream selection step.

In the first embodiment, the sensor 13 has accessed in step 21 at least one attribute in the negotiation message, which may include the second attribute identifying the service provider 14. As previously detailed, the second attribute service provider may comprise a URI of the service provider 14.

If the URI includes an address of the notification reception server 16, and the URI has been sent by the sensor 13 to the notification server 14, the notification server may send a notification to the notification reception server 16, at the address specified in the URI, the notification comprising at least one identifier of the selected data stream and an indication of the result of the comparison. An advantage of such an embodiment is that the service providers of the telecommunications network 10 do not have to notify the operator of the network 10 in advance, and thus do not have to know the network operator 10.

If the URI comprises a generic identifier of the service provider 15, the notification server 14 may store a database that maps generic identifiers of service providers to addresses of their respective notification reception servers. Data may be provided to such a database during an initial stage 20 where the service providers of the telecommunications network 10 declare to the network operator the addresses where they wish the notifications to be sent.

According to the second embodiment where the negotiation message detected by the sensor 13 in step 21 does not include the aforementioned extension and the notification server 14 therefore receives no attribute identifying the service provider 15, the notification server 14 may then store a database that maps the service providers hosting and managing the exchange of data streams, to the respective network identifiers of the users. To this end, during a preliminary step 20, the service providers wishing to be notified may identify the users for which they wish to receive notification about bandwidth consumption by the data stream.

The notification server 14 thus sends to the notification reception server 16, in step 25, a notification including at least one identifier of the selected data stream and an indication of a result of the comparison of step 23.

For example, the notification may include an XML file or http POST file with different parameters.

The parameters in question, in the context of a P2P data stream, may include a combination of the parameters listed in Table 1 below.

TABLE 1

| | Notification parameters Notification parameters |
|---|---|
| Network identifier | Identity of the entity sending the notification (network operator) |
| user_1 | Identifier of the first user terminal (for example IP address/port number or private identifier user_identifier from the extension) |
| user_2 | Identifier of the second user terminal (for example IP address/port number or private identifier user_identifier from the extension) |
| detect_time | Timestamp indicating the moment when the consumed bandwidth was compared to said bandwidth threshold |
| error_type | Type of error encountered (type of congestion) |
| recommendation | Recommendation message provided by the operator |

The error_type parameter can specify multiple types of error bases on its value, for example:
  00: congestion detected;
  01: improper use;
  10 and 11: other types of errors, or conversely, appropriate use or no congestion detected.

Other parameters than the error_type parameter may be used to indicate the result of the comparison.

The recommendation attribute is purely optional. It may, for example, be in JSON ("Java Script Object Notation) format, may depend on the error_type attribute, and may comprise:
  {b=X}: indicates the maximum bandwidth value for the DC API (attribute B of the SDP ("Session Data Protocol"));
  any other type of recommendation.

This notification may be encrypted by TLS or DTLS for example.

The service provider 15 may use the notification for different purposes:
  to enrich the statistics of the service provider 15 in the network 10 of the operator, enabling comparisons of multiple operators;
  to initiate a concrete action by the service provider 15: for example, reducing the bitrate available to a WebRTC data stream considered to be receiving an unfair share.

FIG. 1 shows a single service provider 15. However, the notification server 14 may be responsible for notifying a plurality of service providers. For this purpose, a plurality of sensors 13 may be distributed in the network 10 to allow selecting data streams between any users.

Figure 3:
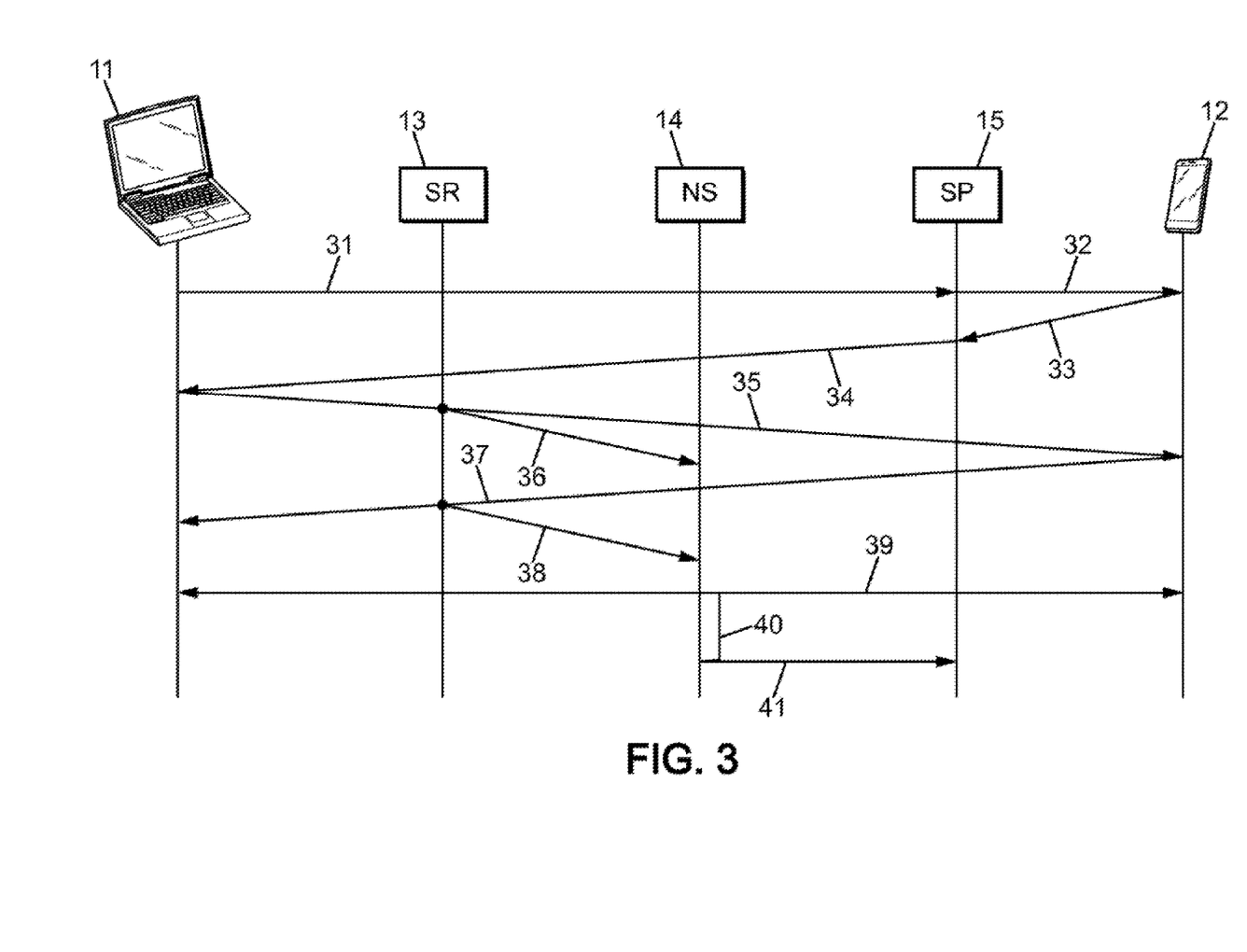
FIG. 3 illustrates a diagram of exchanges in the system represented in FIG. 1, according to an embodiment of the invention.

FIG. 3 shows a diagram of exchanges in the notification system of FIG. 1, according to one embodiment of the invention.

FIG. 3 illustrates a specific implementation of the invention and is given here purely for illustrative purposes. It occurs in the context of a provider of an OTT service for implementing a WebRTC service between two respective user terminals 11 and 12. It falls within the first embodiment of step 21 of FIG. 2, where the extension of the DTLS negotiation message comprises the four attributes presented above.

The first user terminal 11 sends (step 31) a session initiation message, via the SDP protocol for example, to the service provider 15, in order to set up a session to exchange a WebRTC data stream with the user of the second user terminal 12. The session initiation message is forwarded (step 32) by the service provider 15 to the second user terminal 12.

When the second user accepts the session initiation, the second user terminal 12 sends back (step 33) an acceptance message, still using the SDP protocol, to the service provider 15, which forwards the acceptance message to the first user terminal 11 (step 34).

Next comes exchanges of DTLS handshake messages to set up encryption of the WebRTC data stream using the DTLS protocol.

A DTLS negotiation message is thus sent from the first user terminal 11 to the second user terminal 12 (step 35). The negotiation message DTLS of this example comprises the four attributes of the extension defined above.

The sensor 13 on the network path between the user terminals 11 and 12 is capable of detecting, in the DTLS negotiation message, the first attribute application_protocol and of deducing that the data stream that will be exchanged between the user terminals 11 and 12 is a WebRTC data stream. The sensor 13 then selects the WebRTC data stream and sends to the notification server 14 (step 36) an identifier of the selected data stream as well as the second attribute comprising the identifier of the service provider 15, extracted from the DTLS negotiation message.

Note that selection of the WebRTC data stream may also take place on the return path of the DTLS handshake, when a DTLS negotiation message is sent (37) from the second user terminal 12 to the first terminal user 11. In this case, the sensor sends to the notification server (step 38) an identifier of the selected data stream (the source and destination identifiers are reversed in comparison to step 36).

The WebRTC exchanges then take place bidirectionally (step 39) between the first user terminal 11 and the second 12 user terminal.

Information about the bandwidth consumed by the WebRTC data stream can be sent to the notification server, for comparison (step 40) between a consumed bandwidth value and a bandwidth threshold, as described above, and a notification is sent (step 41) from the notification server 14 to the service provider 15 (for example to the notification reception server 16) by means of the second attribute (URI of the service provider 15) of the extension of the DTLS negotiation message.

The invention thus allows individually identifying the service provider to be notified, improving the confidentiality of the data exchanged between network operator and service provider in comparison to the CONEX solution. The proposed solution is compatible with any service using any transport protocol. For example, it is compatible with WebRTC streams using the UDP transport protocol.

The invention claimed is:

1. A method for notifying a service provider, implemented in a telecommunications network, wherein the method comprises the steps of:
    detecting at least one negotiation message for setting up a data stream, wherein the negotiation message comprise a first attribute that identifies a protocol used to transport the data stream;
    detecting the protocol used to transport the data stream based on the first attribute;
    if the detected protocol corresponds to a certain protocol, selecting the data stream transported in the telecommunications network for at least one user terminal of said service provider;
    comparing a value of bandwidth consumed by said selected data stream to a bandwidth threshold;
    sending a notification to the service provider, the notification comprising at least one identifier of the selected data stream and an indication of a result of said comparison.

2. The method according to claim 1, wherein said protocol is the WebRTC protocol and the data stream is transported between at least two user terminals.

3. The method according to claim 1, wherein said negotiation message is a handshake type message defined by the DTLS or TLS protocol.

4. The method according to claim 3,
    wherein said protocol is the WebRTC protocol and the data stream is transported between at least two user terminals;
    wherein the WebRTC protocol is detected for the data stream transport upon detection of at least one STUN frame exchanged between the two user terminals prior to detection of the negotiation message according to the TLS or DTLS protocol.

5. The method according to claim 1, wherein the negotiation message comprises a second attribute identifying the service provider, said notification message being sent to the service provider identified by said second attribute.

6. The method according to claim 1, further comprising a step of storing a database associating service providers with respective network identifiers of users,
    wherein said user terminal of the service provider is identified in the network by a given network identifier;
    wherein the notification is sent to the service provider in the database associated with the given network identifier.

7. The method according to claim 6, wherein a user's network identifier comprises an IP address/port number data pair.

8. The method according to claim 1, wherein the identifier of the selected stream comprises at least one of the following: an identifier of the operator of said network; at least one identifier of said user;
    a timestamp indicating the moment when the consumed bandwidth was compared to said bandwidth threshold.

9. The method according to claim 8, wherein the notification further comprises a recommendation for adjusting the bandwidth allocated to said stream by said service provider, when the bandwidth exceeds said bandwidth threshold.

10. A system for notifying a service provider, the system comprising:
    a sensor configured to detect a protocol used to transport a data stream and to select the data stream transported in a telecommunications network, for at least one user terminal of said service provider, if the detected protocol correspond to a certain protocol based on a prior detection of at least one negotiation message for setting up the data stream, said data stream selection being based on said negotiation message wherein the negotiation message comprises a first attribute that identifies a protocol used to transport the data stream, said data stream selection being based on said first attribute:
    comparison means for comparing a value of the bandwidth consumed by said selected data stream to a bandwidth threshold;
    a notification server configured to send a notification to the service provider, the notification comprising at least one identifier of the selected stream and an indication of a result of said comparison.

11. A non-transitory computer readable storage medium, with a program stored thereon, said program comprising instructions for implementing the method according to claim 1, when the program is executed by a processor.

* * * * *